United States Patent

Falk

[15] 3,676,682

[45] July 11, 1972

[54] ABSORBED IONIZING RADIATION MEASURING DEVICE

[72] Inventor: Fred W. Falk, 36 Philipp Schmitt Str., Sandhausen, Germany

[22] Filed: Oct. 30, 1968

[21] Appl. No.: 774,569

[52] U.S. Cl. ..............................250/83.6, 250/83.1, 313/61, 313/93
[51] Int. Cl. ........................................G01t 1/18, H01j 39/26
[58] Field of Search ....................250/83.1, 83.6; 313/93, 61

[56] References Cited

UNITED STATES PATENTS

| | | | |
|---|---|---|---|
| 2,596,080 | 5/1952 | Raper et al. | 313/93 |
| 2,933,610 | 4/1960 | Ress | 313/93 X |
| 3,004,165 | 10/1961 | Minowitz et al. | 313/93 X |
| 3,396,275 | 8/1968 | Martin et al. | 250/83.6 |
| 3,478,205 | 11/1969 | Sporek | 250/83.6 X |

*Primary Examiner*—Archie R. Borchelt
*Attorney*—Jacobi, Lilling & Siegel

[57] ABSTRACT

An ionization chamber for measuring absorbed radiation is disclosed, the chamber including a housing which incorporates an anode, a cathode, and a space charge electrode. The anode comprises a conducting plate which has a plurality of protruding needle points with each of the needle points and the conducting plate being at the same electrical potential. The space charge electrode has a plurality of holes therein and is physically displaced from the anode with the holes of the space charge electrode being in registry with the needle points of the anode. The potential of the space charge electrode is less than that of the anode itself.

4 Claims, 8 Drawing Figures

ABSORBED IONIZING RADIATION MEASURING DEVICE

This invention relates to the measuring of ionizing radiation and more particularly relates to measuring the absorbed energy does in rads or does rate in rads per unit of time from any radiation including X-rays, gamma rays, protons, neutrons, fission products, etc. from background levels to lethal disaster levels and from the minimum biologically significant energy level which produces skin damage through the multi-megavolt level.

By way of introduction, a summary of radiation measuring units should be helpful. Radiation intensity is commonly expressed in lumens per unit area in the visible and ultraviolet portion of the transverse electromagnetic spectrum and progressively as the average energy per hpton times the number of photons per unit of area and time (ergs/cm²s) through the entire ionizing portion of the spectrum. In recognition of the corpuscular nature of the energy, each photon has energy $E = h\nu$ where $h$ is Plank's constant and $\nu$ is the frequency of radiation. Intensity of more distinctly corpuscular radiation is simply expressed as the average energy per particle times the number of particles (alpha, beta, p, n, etc.) per unit of area and time (ergs/cm²s.). Intensity is only one of several factors (atomic structure, density, energy state, presence of electric field, energy of radiation, etc.) determining the ionization produced by irradiation of a unit volume of material. Radiation causing primary phenomena other than ionization, as for example kinetic energy transfer and change of atomic energy state, usually results in follow-on ionization. The total ionization energy therefore closely approximates the total absorbed energy. The ionization in living cells caused by absorbed radiant energy in turn causes a biological effect. Concentrated energy absorption has a higher degree of biological effect. Notable is the high linear energy transfer and resulting high specific ionization caused by large particles. As the effects of ionizing radiation were observed, various units of measurement evolved. The roentgen expresses the amount of ionization in ampere seconds produced per gram of air by X or gamma radiation and is referred to as the unit of exposure dose since nothing is said about the effect on other media. The rad expresses energy in ergs imparted to matter by ionizing particles per gram of material from any radiation and is referred to as the unit of absorbed dose (one rad=100 ergs per gram). One roentgen of exposure results in approximately one rad (93 ergs per gram) of absorbed energy in air throughout the photon energy spectrum. For particles and in material other than air, the absorbed dose varies significantly both above and below the exposure dose. Knowledge of the exposure dose can therefore be very misleading when evaluating the biological effects of radiation. Further complications result when relating the absorbed dose to the biological effects for neutrons and large particles. Considerably more damage is caused per rad by neutrons at certain energies and by large particles.

The relatively biological effect is therefore expressed in a unit known as the rem which is quantitatively given by multiplying the dose in rads by the relative biological effect (RBE) for the particle. The RBE has been determined theoretically and empirically and is published in tables.

Knowledge of the biological effect of ionizing radiation therefore requires the capability of determining the type of radiation and the absorbed dose at the area of interest. The prior state of the art provides various means of measuring both exposure and absorbed dose or dose rate, but does not provide a practical device for measuring absorbed dose or dose rate from radiation over the full energy and intensity range producing biologically significant ionization as a function of both the depth and type of tissue. An object of the present invention is, therefore, to measure equivalent absorbed dose in rads or dose rate in rads per unit of time to areas of interest in the human body from all types of ionizing radiation including mixed radiation.

A further object of the present invention is to measure absorbed energy dose from background levels to disaster intensity levels.

Another object of this invention is to measure radiation from the threshold of biologically significant energy levels through multi-megavolt levels.

Still another object of the present invention is to measure the absorbed energy dose in a gaseous media submerged at varying depths in any media.

The above and other objects, features, and advantages of the present invention will become apparent upon consideration of the following description when read in conjunction with the accompanying drawing.

Figure 6:
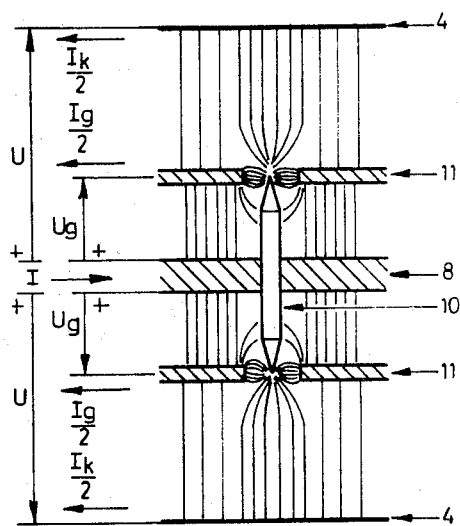

FIG. 6 shows an enlarged view of a portion of the cross section of covers 4, anode 8, needle 10, and electrode 11 with the electric field distribution.

Figure 7:
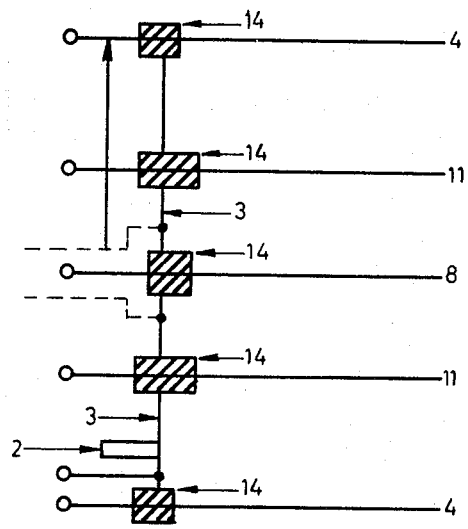

FIG. 7 shows an alternative method to the use of protection rings for the reduction of leakage current.

Figure 8:
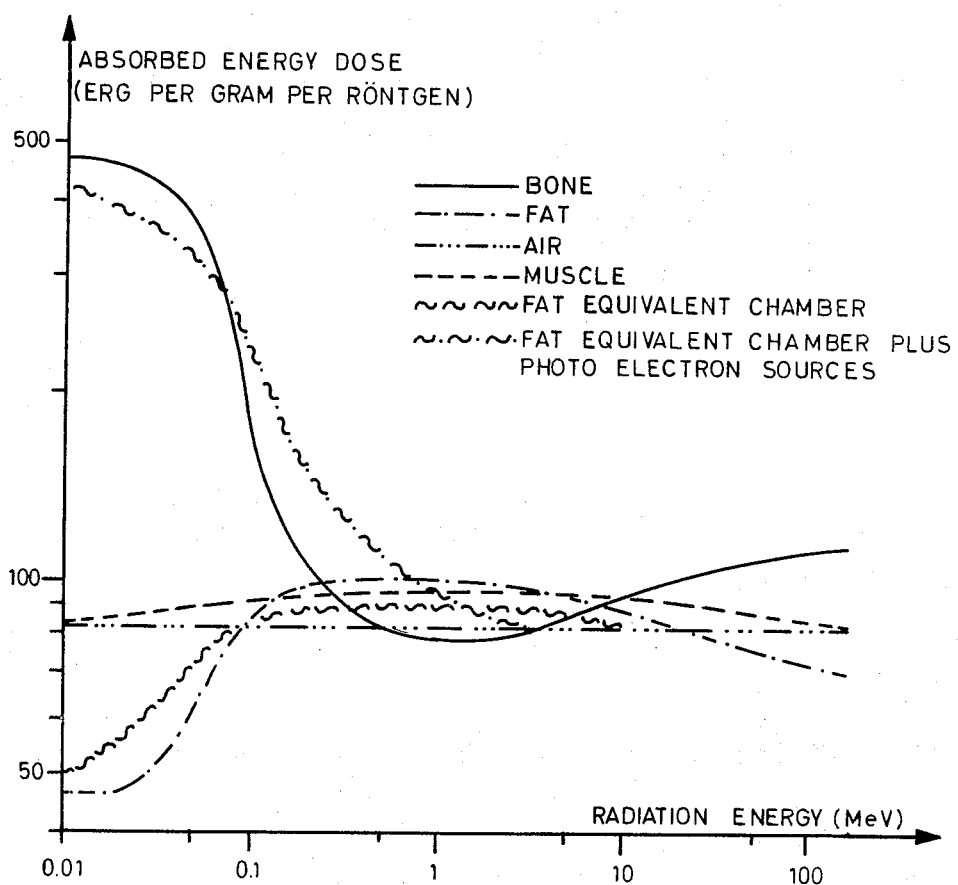

FIG. 8 illustrates the relative energy response of various tissues, chambers, and covers to that of air.

Referring to the numbered components in FIGS. 1 through 7, the device functions as follows:

Ionizing radiation enters the chamber 1 which is filled with a gas having an atomic composition with the same relative amounts of important elements as are found in tissue of the biological substance of interest. The relative amounts of hydrogen and nitrogen are particularly important because of their neutron reactions. A mixture of 64% $CH_4$, 32.6% $CO_2$, and 3.6% $N_2$ by pressure will provide satisfactory gas if average muscle tissue is selected as the fundamental energy response curve for the device. FIG. 8 shows energy response curves of various biolotical substances relative to air or, in other words, to the roentgen. FIG. 8 is for the purpose of illustration only and is not to scale. The gas may be allowed to flow continually through chamber 1 by attaching a gas source and exhaust to nozzles 2 or the gas may be sealed in the chamber. The nozzles 2, housing 3, and covers 4 are constructed of a material which has the same atomic tissue equivalency of important elements as the gas. A muscle tissue equivalent plastic with adequate conductivity can be prepared from polyethylene with the addition of graphite and nitrogen compounds.

Figure 1:
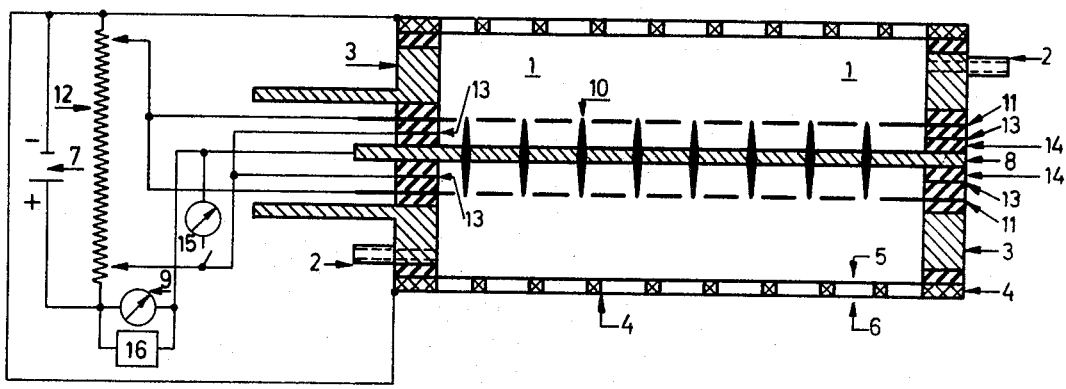
FIG. 1 shows a cross sectional view of the device with a schematic showing electrical connections.
Figure 2:
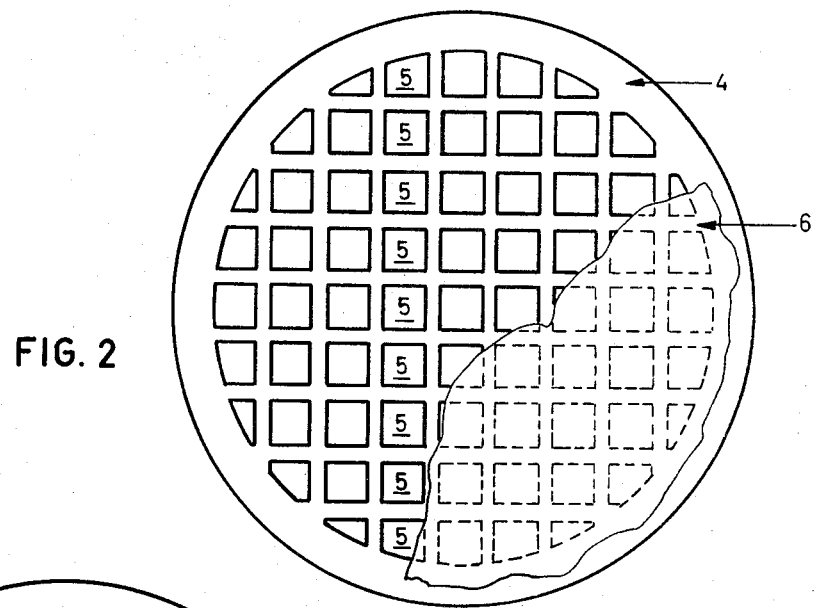
FIG. 2 shows a top view of the covers 4 of the device.

The covers 4, FIGS. 1 and 2, are provided with windows 5. The covers 4 are constructed so as to be easily removable and so that several may be attached simultaneously in layers. The windows 5 are covered with panes 6 which may all be of the same or different material for a given cover 4. One set of covers 4 can be outfitted with panes 6 of 0.7 mg cm² polyethylene folie to admit radiation which would penetrate the insensitive epidermis thus allowing measurement of skin dose throughout the spectrum. Untraviolet light causes biologically significant ionization and can be measured in rads. However, visible light must be excluded from chamber 1; or alternatively its contribution determined and electrically zeroed out of the reading. Several covers can be provided, each with thicker panes 6, to measure the dose at greater tissue depth. For depth greater than the thickness of cover 4, the windows 5 and panes 6 are dispensed with and cover 4 made as thick as the desired tissue depth.

The panes 6 may also be made of material having a different energy absorption versus radiation energy response curve from that of the gas. The panes 6 are effectively photo cathodes each releasing photo electrons at energies above the threshold energy for the atoms in the material. The elements have different threshold energies and different energy response curves throughout the photo and compton absorption regions. That is why the same intensity of radiation results in more or less absorption of energy than is absorbed in air depending on the type of tissue as illustrated by FIG. 8. It is therefore theoretically possible to duplicate any desired energy response curve by constructing the panes 6 sufficiently small and selecting the element for each pane such that the integral of the individual response curves together with the response curve of the gas filled chamber 1 is equal to the response curve of the tissue at the biological area of interest. In practice, with a uniform radiation field, a degree of accuracy consistent with the remainder of the device can be obtained as a function of cost. The panes 6 containing the elements intended to alter the energy response curve should be as thin as possible to prevent absorption. Energy absorbed by the panes should not exceed that of the radiation insensitive outer layer (if any) of the biological organ of interest.

It is possible to construct an all-purpose device with chamber 1, filling gas, cover 4, housing 3, etc. constructed of material having an atomic composition with the same relative amounts of important elements as are found in fat. By constructing interchangeable covers in the above manner, it is possible to obtain energy response curves from the device which represent fat when covered only with suitable thin folie, and muscle with the appropriate cover, or bone with still another cover. An example is illustrated in FIG. 8.

By utilizing the layer principle of covers, it is possible to construct a chamber 1, covers 4, etc. such that the chamber 1 and first cover have an energy response equal to bone or a specific inner organ. Additional covers can then be added which have tissue equivalency with the tissue surrounding the bone or internal organ in order to obtain a realistic depth dose.

Care must be exercised in fabricating the covers in order to insure electron equilibrium between layers. One method is to utilize conducting materials and eliminate space between layers.

The device is shown as round in FIG. 2 but can be made any desired shape. The flat construction of FIG. 1, however, has some advantages; the high capacitance helps maintain linearity at high dose rates. By making the device as thin as possible, directional sensitivity is reduced and approaches a $4\pi$ geometry.

Electrons released by ionization resulting from radiation absorbed in the material of housing 3, covers 4, and panes 6 may enter the gas in chamber 1. These electrons, in addition to electrons and positive ions separated by radiation being absorbed in the gas, will move through the gas under influence of the electric field created by applied voltage from voltage source 7. This voltage is applied between the covers 4 which are electrically connected together and the anode 8 through current meter 9. The covers 4 being electrically connected to the negative terminal of the voltage source 7 serve as cathodes. The current flow through the chamber 1 is registered on current meter 9 which is calibrated in rads per unit of time. It is essential that the current flow be proportional to the primary ionization of the tissue equivalent material in order to truly record the absorbed energy dose rate. The only exception is the deliberate change in energy response through the addition of other elements in panes 6 to give the energy response curve of other tissue. It is also essential that the minute number of ions available at background dose rates be multiplied to provide sufficient current to be measured. Conventional devices to utilize gas amplification make use of fine metal wires for the anode to raise the field strength in the area of the wire. By keeping the field strength below that of the Gieger-Müller region, the current flow with gas amplification of ions remains proportional to the primary ionization.

The operating principle of conventional methods of gas amplification is explained in this paragraph to illustrate the novelty of the present invention. The electric field strength about a fine wire anode is given by the following formula for a detector with cylindrical geometry:

$$E(d) = \frac{V}{d \ln \frac{b}{a}}$$

where
$d$ is the distance from the anode at which the field strength $E(d)$ is being evaluated
$V$ is the absolute value of the voltage applied between cathode and anode
$b$ is the radius of the cathode
$a$ is the radius of the anode The field strength close to the anode increases rapidly and if $V$ is sufficiently large and $a$ sufficiently small, the electrons drifting toward the anode acquire enough energy between collisions to produce secondary ions and electrons which are also accelerated and produce more secondary electrons. Photons are also released during the production of secondary electrons. The photons in turn release photo electrons throughout the filling gas and form the walls of the case and the cathode. The combined effect of the secondary electrons and the photons produce considerably more electrons than are available for the same primary ionization if the detector is operated in the plateau region as a conventional ionization chamber. The final number of electrons available per primary ionization electron is given by the following series:

$$M = x + x^2y + x^3y^2 + \ldots$$

where:
$M$ = final number of electrons per primary electron
$x$ = number of secondary electrons formed per primary electron
$y$ = probability that a photo electron is formed per secondary electron The principle of gas amplification has been known for some time and has found application in the so-called proportional counter. If the ratio of $V/a$ is increased still further, the detector will eventually be brought into the Geiger-Müller region. This region is characterized by the cessation of proportionality between the pulse amplitude or average current and the primary ionization. This is caused by the formation of a space charge around the anode. The space charge is considerably reduced by the addition of a grid which is placed at a potential slightly positive with respect to the cathode.

The space charge of positive ions which prevented further increase of gas amplification without loss of proportionality between the primary ionization and the output current of the detector is attracted to the negative grid and neutralized. The effective volume for collecting primary ionization continues to be the entire region encompassed by the cathode however. Thus, higher gas amplification limits as well as lower voltage $V$ requirements and proportionality of the detector response to primary ionization are realized through use of a grid in what would otherwise be the Geiger-Müller region.

The conventional system of gas amplification described above is unsuited for absorbed energy dose measuring because of the need for metal wires or plates. The introduction of metal into chamber 1 completely changes its energy response at low energy levels and causes particularly distorted results in a neutron field. The use of parallel non-metallic conducting plates require excessive voltages to produce gas amplification due to the homogeneous electric field. Finally, the present invention incorporates a more efficient electric field distribution for suppression of the positive ion space charge than is possible with the grid described above for conventional systems.

Figure 3:
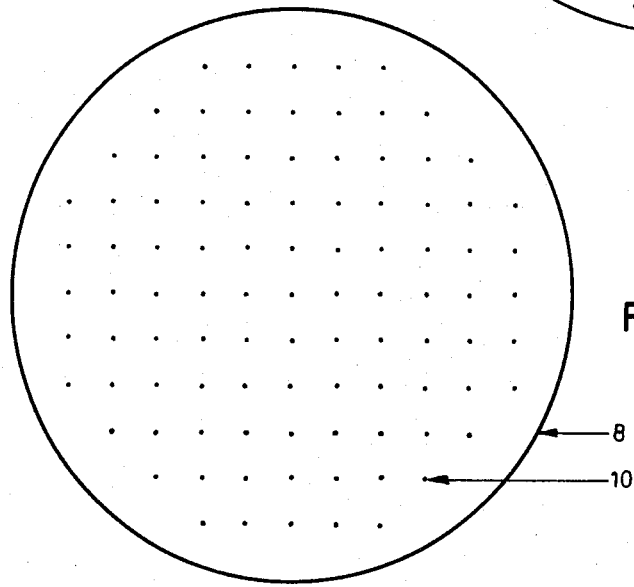
FIG. 3 shows a top view of the anode 8.

In order to provide an inhomogeneous electric field with elements found in human tissue, the structure shown in FIGS. 1, 3 and 6 for anode 8 is used. The material for the plate used to construct anode 8 is the same conducting tissue equivalent material used for housing 3 and cover 4. The needle 10 must also be of conducting material and capable of being sharpened to a fine point. Carbon is one suitable material for needle 10. The sharp point results in an electric field distribution with respect to the cover 4 as shown in FIG. 6. The electric lines of force converge on the point and result in a much higher field strength. Gas amplification takes place around the needle points and results in a space charge of positive ions similar to what occurs around the fine wire of conventional gas amplification devices.

Figure 4:
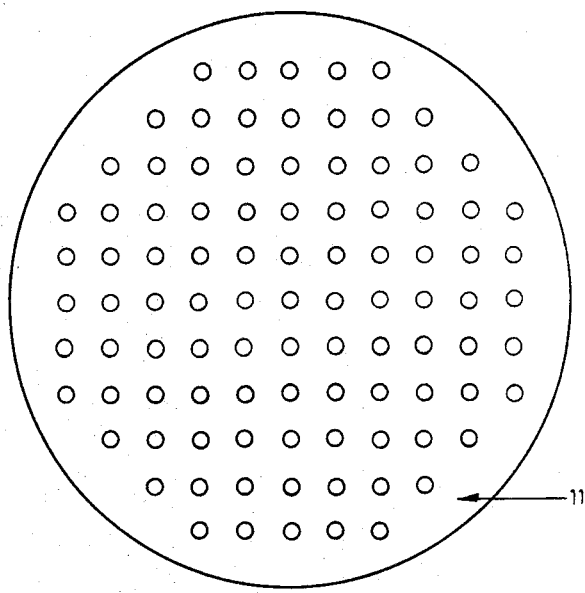
FIG. 4 shows a top view of the electrode 11.
Figure 5:
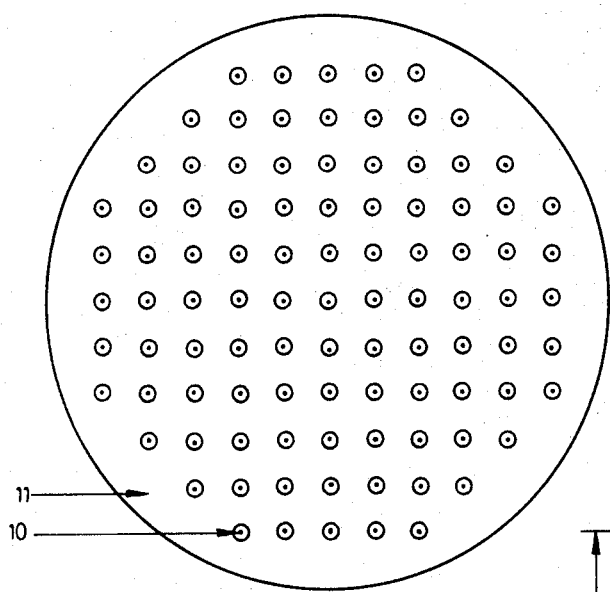
FIG. 5 shows a top view of the electrode 11 in place over the anode 8.

Electron 11 is constructed and assembled in the device as shown in FIGS. 1, 4 and 6. Electrode 11 is made of the same conducting tissue equivalent material as housing 3, covers 4, and anode 8. The function of electrode 11 is to collect the space charge without adversely affecting the electric field distribution. Important factors to consider are as follows: Electrode 11 should collect as few electrons as possible in the area between it and the covers 4 because this current does not flow through current meter 9 and therefore does not contribute to the indication. The geometry and electric field distribution of FIG. 6 shows how this objective is met. The second objective is to collect as many positive ions as possible from the vicinity of the needle points. FIG. 6 shows the high electric field concentration to reach this objective. It is also pointed out that this current does flow through current meter 9 and is therefore not lost in the indication. In addition to the geometry which must be varied in development models to find the optimum, it is possible to change the field strength distribution by changing the voltage on electrode 11. Potentiometer 12 is included for this purpose. The optimum voltage is positive with respect to the covers 4 and negative with respect to anode 8, but will be found to be near the negative end of potentiometer 12.

For the construction shown in FIG. 1 it is essential to utilize protection rings 13 to reduce leakage around and through insulators 14. Teflon is a satisfactory insulator material. To further reduce the deleterious effect of leakage current, potentiometer 12 is equipped with a second tap to provide the same voltage to the protection rings as appears on anode 8 for a given dose rate. Zeroing meter 15 is provided to indicate when the lower tap of potentiometer 12 is adjusted so that no potential exists across insulator 14. As an alternate to protection rings the construction of FIG. 7 can be used. This is in many ways superior to protection rings: insulators can be smaller and therefore have greater resistance. The housing can be grounded and affords electrostatic shielding. The balancing circuit of FIG. 1 can also be used with this construction, but the superior resistance makes it unnecessary except for laboratory applications.

The indication on current meter 9 is in rads per unit of time. For situations where the absorbed energy dose rate changes as a function of time, the current must be integrated to register total dose. This can be done, if desired, by conventional means represented by integrating circuit 16. The device will indicate true absorbed energy dose rate for any radiation or mixed radiation including neutrons if the tissue equivalency of the materials is rigidly adhered to. Proper proportions of nitrogen and hydrogen are important for the following reactions:

$N_{14}$ $(n,p)$ $C_{14}$ and $H^1$ $(n,\gamma)$ $H^2$

The following applications further illustrate the utility of the device: the choice of covers 4 provided can be made as large as desired. For example, an extremely thin mylar folie can be used to represent the epidermis when measuring the absorbed dose to the underlying layers of skin from ultraviolet to 50 KeV X-ray energies. Shielding can be provided to represent the cornea and vitreous matter in front of the lens of the human eye or to represent tissue in front of bones, etc. The construction, density, geometry, etc. of the device should represent that of the area of interest where the equivalent absorbed dose is to be measured but can also be made for general purpose use.

For energies above approximately 200 KeV the absorbed dose is approximately equal to the roentgen equivalent dose throughout the body. For energy levels below 200 KeV, the absorbed dose becomes ever more energy dependent for different body parts and a compensation means must be provided in an all purpose device to give an indication of the equivalent absorbed dose for the respective body parts. This means is provided by exchanging covers 4 with different combinations of photo electron sources in the panes 6.

I claim:

1. An ionization chamber for measuring absorbed radiation, said chamber including a housing incorporating an anode and a cathode, said anode comprising a conducting plate having a plurality of protruding needle points, each of said needle points and said conducting plate being at the same potential, a space charge electrode having a plurality of holes therein, said space charge electrode being physically displaced from said anode with the holes of said space charge electrode being in registry with said needle points of said anode with the potential of said space charge electrode being less than that of said anode.

2. An ionization chamber as defined in claim 1, wherein each of said components thereof are constructed of tissue equivalent material.

3. An ionization chamber as defined in claim 2, wherein the edges of said hole in said space charge electrode are in close proximity to said needle points of said anode.

4. An ionization chamber as defined in claim 3, wherein said housing contains a gas and wherein said housing has windows therein which are covered with thin foil of preselected material, whereby the total effect of the covers in combination with said chamber and said filling gas therein provides a preselected energy response.

* * * * *